Oct. 5, 1954
J. A. WILSON
2,690,694
LIGHT ABSORPTION ANALYSIS METHOD
Filed May 31, 1950
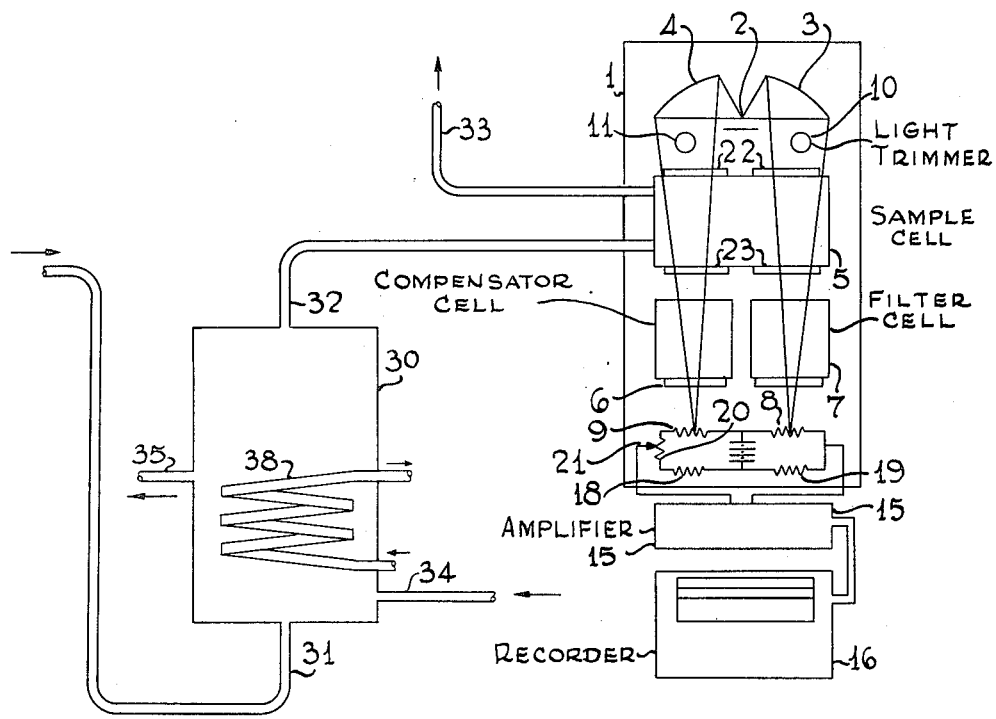
James A. Wilson Inventor
By W. O. Heilman Attorney Patented Oct. 5, 1954

2,690,694

UNITED STATES PATENT OFFICE 2,690,694

LIGHT ABSORPTION ANALYSIS METHOD

James A. Wilson, Linden, N. J., assignor to Standard Oil Development Company, a corporation of Delaware Application May 31, 1950, Serial No. 165,125

4 Claims. (Cl. 88—14)

This invention concerns the characterization of fluid samples by light absorption, or transmission characteristics. The particular point of novelty concerns the introduction of a vapor sample from a liquid source to the sample cell of the analysis apparatus. In accordance with this invention, a gas is bubbled through the sample to be analyzed; vapors resulting from the gas contacting the fluid sample are then carried into the sample cell by the gas employed. The invention is of particular application to the analysis of hydrocarbons which are normally liquid, but which may be successfully analyzed according to gas analysis techniques by the method or in the apparatus of this invention.

The development of light absorption analytical apparatus for both analytical and control purposes has become of particular interest in the characterization of hydrocarbon mixtures. It has been found that by passing light of suitable wave length through hydrocarbon samples, it is possible to quantitatively determine the amount of any particular hydrocarbon in the mixture. For simple hydrocarbon mixtures, the methods broadly disclosed by Hans Schmick, as for example in U. S. Patent 1,758,088, are suitable. For more complicated mixtures certain refinements in technique are required which have been disclosed and claimed in U. S. application 31,346, filed June 5, 1948, by Charles W. Skarstrom. However, it has heretofore been a limitation that the sample employed must preferably be in gaseous phase. Thus, the analyzers now known to the art are best adapted for gas analysis. While it is possible to modify conventional analyzers so as to permit the analysis of liquid samples, heretofore such attempts have not been generally applied because of certain complications. Attempts to successfully characterize liquid samples on a continuous flow basis are complicated by the presence of bubbles in the liquid, and by the difficulty of employing pressure in a liquid sample cell. It is, therefore, the principal object of this invention to provide a method and apparatus for successfully characterizing normally liquid samples.

In accordance with this invention, this objective is attained by bubbling a gas, preferably an inert, radiation transparent gas, through the liquid sample to be characterized. The liquid constituents of the sample volatilize in the gas so that vapors of the liquid sample are carried to the sample cell. It is then possible to use the conventional gas analysis techniques to analyze the vaporized liquid sample.

It is apparent that this technique may be applied to any desired type of gas analysis apparatus. Thus, for example, any desired band of the light spectrum may be employed in the analysis, although it is presently contemplated that the infra-red portion of the spectrum is of particular application. Again, any of the known types of analytical apparatus may be utilized. The apparatus may consist of a monochromatic type of instrument in which a monochromator or filter system is employed to provide substantially monochromatic energy. This energy is then passed through the sample obtained in accordance with this invention, for characterization as ordinarily carried out. Again, the apparatus may consist of what is known as a dual beam type of apparatus. In dual beam analytical instruments, two beams of light energy are employed. Each of the beams is passed through the sample to be characterized, but thereafter the beams are passed in separate paths through filter and compensator cells containing different constituents. This type of apparatus is particularly attractive since it is possible to conveniently sensitize such apparatus so as to permit the determination of one constituent in a mixture of constituents, some or all of which have light absorbing characteristics.

For the purpose of clarity, the invention will be described with particular reference to a conventional type of dual beam infra-red analyzer. The appended drawing diagrammatically illustrates one embodiment of this invention as applied in conjunction with one conventional form of such an analyzer. The invention will be fully understood from the following description drawn with reference to this drawing.

Referring to the drawing, the numeral 1 generally indicates an infra-red analyzer. A light source 2 capable of emitting infra-red radiation is placed at one end of the analyzer. To each side and behind the light source are placed concave mirrors 3 and 4 which serve to direct light from source 2 along the two paths indicated. Thus one beam of light passes from the source 2 to be reflected from mirror 4 and thence through sample cell 5 and compensator cell 6 to impinge on the light energy detector 9. The other beam of energy is reflected from mirror 3 to pass through the sample cell 5, through filter cell 7 to impinge on the light energy detector 8. The energy detectors 8 and 9 may consist of resistance thermometers as illustrated, or may consist of thermopile detectors or may consist of any other desired type of radiation detectors.

As illustrated, the detectors are preferably arranged in a bridge circuit consisting of the elements 18, 19, and 21, in such a manner that the bridge circuit will provide an output feed to amplifier 15 which is equal to the differential output of the two detectors. By this means amplifier 15 will provide an amplified signal proportional to the difference in radiation impinging on the two detectors 8 and 9. This signal may be recorded on the recorder 16 in the conventional manner.

In addition to the elements described, it is preferred that "light trimmers" 10 and 11 be provided in each of the two beams of radiation described. The light trimmers can be adjusted so as to improve the selectivity of the results which can be obtained. These light trimmers may simply be opaque shutters, or plates positioned in each of the beams of radiation so as to permit a variation in the amount of radiation in the two light beams.

Each of the cells described; that is, the sample cell 5, the filter cell 7, and the compensator cell 6, are provided with suitable inlets and outlets to permit the introduction of fluid constituents to the cells. Ordinarily, suitable constituents are supplied to the filter and compensator cells which are then sealed to maintain the constituents in the cells at desired pressures. Particularly, for control applications, it is desirable to continuously pass the sample through the sample cell 5. While not a part of this invention it is to be understood that suitable constituents are placed in the filter and compensator cells, so that the apparatus may selectively determine a particular constituent in the sample which is to be analyzed. As indicated, suitable methods of sensitizing the apparatus illustrated are now known to the art.

In accordance with this invention, novel apparatus is provided in conjunction with the conventional analyzer heretofore described, to permit introduction of a vaporized liquid sample to the sample cell 5. For this purpose an auxiliary vessel 30 is employed equipped with a gas inlet 31 at the bottom thereof. A liquid sample to be characterized is then maintained in the vessel 30, while an inert gas is bubbled through inlet 31 and is removed from outlet 32 at the top of the vessel. This gas is then conducted to the sample cell 5 and preferably is continuously swept through sample cell 5 for removal through line 33. It is essential that the liquid maintained in vessel 31 is continuously removed to avoid any effects of fractionation which would otherwise occur to cause error in the analytical results. Thus, a liquid inlet 34 is provided at the bottom of vessel 30 and liquid outlet 35 is provided at an upper portion of the vessel. Consequently, the liquid sample to be analyzed will pass through vessel 30 continuously from inlet 34 to outlet 35, while gas is continuously passed through the apparatus from inlet 31 through outlet 32. The liquid is preferably passed through vessel 30 at a rate of about 2 liters per minute while the gas is similarly passed through at about 2 liters per minute.

The gas employed is preferably an inert gas in the sense that the gas will be chosen so that it will not react with any of the constituents of the sample to be characterized. It is also preferred that the gas be substantially infra-red transparent, as this simplifies the analytical procedure. However, this is not an essential limitation, since even when employing a light absorbing gas, it is possible to suitably sensitize the analysis apparatus. For the infra-red analysis of hydrocarbon samples, it is preferred in this connection that the gas employed consist of nitrogen or oxygen although other gases may be used if desired.

No means are required to disperse the gas in the sample, as the bubbling of the gas through the liquid contained in vessel 30 is sufficient to volatilize enough of the liquid for successful analyses. If desired, however, a fritted glass diffusing disc, or equivalent means, may be positioned in the gas stream so as to thoroughly disperse the gas in the liquid sample contained in vessel 30. It is particularly desirable, however, that a cooling coil 38 be positioned in vessel 30 so that the vapors from the liquid sample will not condense in the lines to the instrument or in the sample cell.

The described technique of bubbling a gas through a liquid sample to permit analysis of the liquid is particularly applicable to the analysis of hydrocarbon samples in which the constituent desired to be analyzed is a normally liquid hydrocarbon. It is not necessary that all constituents of the sample be normally liquid, and as a matter of fact, practice of this invention is very desirable in the determination of a gaseous hydrocarbon which is dissolved in liquid hydrocarbon constituents. The technique has successfully been applied to the introduction and analysis of hydrocarbons having from four to twelve carbon atoms, having a molecular weight range of about 60 to 170, and boiling in the range of about 0 to 400° F.

The actual quantitative analytical results may be computed from partial pressure data of the constituents in the sample or preferably may be obtained on calibration of the apparatus employing control samples containing known quantities of the constituent to be determined.

To specifically suggest some of the applications of this invention, it may be noted that the invention may be applied to the analysis of normal butane in an alkylate containing constituents having up to about 8 carbon atoms, or somewhat greater. Again, the method may be applied to the determination of water contained in liquid samples, or to the determination of impurities in methyl ethyl ketone.

Having fully described this invention, what is claimed is:

1. A method for continuous determination of the light absorption characteristics of constituents of a flowing stream of a liquid material, which comprises continuously introducing a portion of said liquid material into a confined segregation and contacting zone and continuously removing said liquid material therefrom at an intermediate level in said zone, so as to maintain a substantially constant body of said liquid therein, continuously bubbling a stream of a gaseous material into and through said body of liquid in said zone, which gaseous material is substantially non-light absorbent and also non-reactive with said liquid constituents, extracting at least a portion of said constituents in vapor form from said liquid combined in said gaseous material, continuously withdrawing said gaseous material and the extracted constituents as a combined stream from said zone, then passing said combined stream through a beam of light while measuring the light absorption characteristics of said constituents in the presence of said gaseous material.

2. A method according to claim 1, in which said liquid and gaseous materials are introduced into and withdrawn from said segregation zone at substantially equal rates on a volume per unit of time basis.

3. The method defined by claim 1 in which the said liquid material comprises principally hydrocarbons boiling in the range of about 0 to 400° F., having about four to twelve carbon atoms and having molecular weights of about 60–170.

4. The method defined by claim 1, in which the said gaseous material consists of nitrogen.

References Cited in the file of this patent

UNITED STATES PATENTS

| Number | Name | Date |
|---|---|---|
| 1,418,621 | Clark | June 6, 1922 |
| 1,520,121 | Deckebach | Dec. 23, 1924 |
| 1,900,477 | Wittemeier | Mar. 7, 1933 |
| 2,068,476 | Thomas | Jan. 19, 1937 |
| 2,071,680 | Brown et al. | Feb. 23, 1937 |
| 2,269,889 | Blau | Jan. 13, 1942 |
| 2,431,899 | Wolf et al. | Dec. 2, 1947 |
| 2,518,307 | Groebe | Aug. 8, 1950 |
| 2,545,162 | Muly et al. | Mar. 13, 1951 |

OTHER REFERENCES

An Infra Red Chopped-Radiation Analyzer, by G. Kivenson et al., J. O. S. A., December 1948, pages 1086 through 1091.